(12) United States Patent
Back et al.

(10) Patent No.: US 8,190,458 B2
(45) Date of Patent: May 29, 2012

(54) METHOD OF PERFORMING INTEGRATED OILFIELD OPERATIONS

(75) Inventors: Michael Back, Calgary (CA); Daniel Fichter, Calgary (CA); Doug MacDonald, Calgary (CA); Peter Tyler, Calgary (CA); Roger Gallant, Calgary (CA); Dave Mason, Watford (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 699 days.

(21) Appl. No.: 12/015,496

(22) Filed: Jan. 16, 2008

(65) Prior Publication Data

US 2008/0172272 A1    Jul. 17, 2008

Related U.S. Application Data

(60) Provisional application No. 60/880,844, filed on Jan. 17, 2007.

(51) Int. Cl.
*G06Q 10/00* (2006.01)

(52) U.S. Cl. .................. 705/7; 700/28; 700/29; 700/32; 700/83; 700/95; 703/2; 703/10; 702/12; 702/13; 702/14; 702/188

(58) Field of Classification Search ........................ 705/7
See application file for complete search history.

(56) References Cited

U.S. PATENT DOCUMENTS

| | | | |
|---|---|---|---|
| 6,236,894 B1 | 5/2001 | Stoisits et al. | |
| 6,775,578 B2 | 8/2004 | Couet et al. | |
| 6,980,929 B2 | 12/2005 | Aronstam et al. | |
| 7,079,952 B2 | 7/2006 | Thomas et al. | |
| 7,379,853 B2 * | 5/2008 | Middya | 703/10 |
| 2005/0166961 A1 * | 8/2005 | Means et al. | 137/13 |
| 2007/0272407 A1 * | 11/2007 | Lehman et al. | 166/250.1 |

OTHER PUBLICATIONS

Hartman, Joseph C. An economic replacement model with probabilistic asset utilization. IIE Transactions, vol. 33, No. 9, p. 717, Sep. 2001.*
International Search Report dated Jun. 4, 2008 (3 pages).

* cited by examiner

*Primary Examiner* — F. Zeender
*Assistant Examiner* — Fawaad Haider
(74) *Attorney, Agent, or Firm* — Colin L. Wier

(57) ABSTRACT

A method of performing oilfield operations for an oilfield having a subterranean formation with a reservoir therein is provided. The method involves generating a business analysis of the oilfield based on business inputs, generating an operational analysis of the oilfield based on operational inputs, and selectively integrating the business analysis with the operational analysis by using the operational outputs as at least a portion of the business inputs and by using the business outputs as at least a portion of the operational inputs to form an integrated oilfield analysis. The business analysis includes business outputs for characterizing the business impact of projects performed on the oilfield. The operational analysis includes operational outputs for characterizing the operational impact of projects performed on the oilfield. The integrated oilfield analysis includes integrated oilfield outputs for characterizing the business and operational impact of projects performed on the oilfield. The method may also involve developing an oilfield plan based on the integrated oilfield analysis and implementing the oilfield plan.

18 Claims, 8 Drawing Sheets

METHOD OF PERFORMING INTEGRATED OILFIELD OPERATIONS

CROSS-REFERENCE TO RELATED APPLICATIONS

This application claims priority, pursuant to 35 U.S.C. §119(e), to U.S. Patent Application Ser. No. 60/880,844, entitled "Method of Performing Integrated Oilfield Operations," filed on Jan. 17, 2007, which is herein incorporated by reference in its entirety.

BACKGROUND OF THE INVENTION

1. Field of the Invention

The present invention relates to techniques for performing oilfield operations relating to subterranean formations having reservoirs therein. More particularly, the invention relates to techniques for performing oilfield operations involving an analysis of business considerations and their impact on such operations.

2. Background of the Related Art

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIG. 1B-1C, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operations, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipment, such as gauges or other sensors, may be positioned about the oilfield to monitor and manipulate the flow of hydrocarbons from the reservoir(s).

During the oilfield operations, data is typically collected for analysis and/or monitoring of the operations. Data concerning the subterranean formation is collected using a variety of sources. Such data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other status measurements may be gathered using core sampling and well logging techniques. Core samples are used to take physical specimens of the formation at various depths. Well logging involves deployment of a downhole tool into the wellbore to collect various downhole measurements, such as density, resistivity, etc. at various depths. Such logging may be performed during drilling or separate wireline testing. Once the well is formed and completed, fluid flows to the surface using production tubing. As fluid passes to the surface, various dynamic measurements, such as fluid flow rates, pressure, and composition are monitored. These parameters may be used to determine various characteristics of the subterranean formation.

Sensors may be positioned about the oilfield to collect data relating to the oilfield operation, among others. For example, sensors in the wellbore may monitor fluid composition, sensors located along the flow path may monitor flow rates, and sensors at the processing facility may monitor fluids collected. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations may be adjusted based on the received information. Often this information is used to determine when to drill new wells, re-complete existing wells, or alter wellbore production.

Data from one or more wellbores may be analyzed to plan or predict various outcomes at a given wellbore. In some cases, the data from neighboring wellbores (or wellbores with similar conditions or equipment) is used to predict how a well will perform. There are usually a large number of variables and large quantities of data to consider in analyzing wellbore operations. It is, therefore, often useful to model the behavior of the oilfield operation to determine the desired course of action.

Techniques have been developed to model the behavior of geological structures, downhole reservoirs, wellbores, surface facilities as well as other portions of the oilfield operation. Examples of these modeling techniques are shown in U.S. Pat. No. 5,992,519 and WO2004049216. Typically, these modeling techniques have been used to analyze only specific portions of the oilfield operations. More recently, attempts have been made to integrate certain oilfield operations using more than one modeling technique. See, for example, U.S. Pat. No. 6,980,940, WO04049216, 20040220846 and Ser. No. 10/586,283.

In addition to the oilfield data, there are many business considerations, such as value and risk, associated with the oilfield operation that may be considered. Value relates, for example, to the costs associated with the oilfield operation, such as the rig time, equipment repair, manning, taxes, or other expenses of doing business. Risk relates to, for examples, the risks or uncertainties associated with the oilfield operation, such as lost in hole, blow outs, dry holes or other liabilities that may result from injurious or catastrophic events. Businesses strive to manage these business considerations in an effort to perform oilfield operations in the most efficient manner possible. However, there are numerous variables that must be considered in planning oilfield operations. Moreover, conditions often change as oilfield operations progress. It is, therefore, often difficult to determine the best course of action and anticipate the associated risks.

Attempts have been made to anticipate and manage the business considerations in various wellbore operations. For example, techniques have been developed for collecting and calculating costs of wellbore operations. One common technique involves the use of spreadsheets to list and calculate known costs. Other techniques involve the economic evaluation of certain costs of specific portions of the oilfield operation as described, for example, in U.S. patent application Ser. No. 11/510,976. Additionally, techniques have also been developed for evaluating risks associated with oilfield operations as shown, for example, in U.S. Pat. No. 6,512,382. Other examples of business planning associated with cost or risk management are described in PCT Application Nos. WO2006/017453, WO2004/137973, and US Patent/Application Nos. 2004/0220846, 2004/0220790, 2005/0228725, 2005/0149306, U.S. Pat. Nos. 6,266,619, 6,456,844, 6,549,854, 6,775,578, 6,912,459, 7,079,952, and 6,853,921.

While business considerations are an important component of decision making, it is generally desirable to consider other factors. It is typically desirable to avoid additional costs and risks where possible. However, the lowest cost alternative does not always yield the best results. It is, therefore, desirable to consider economic as well as other factors. Despite the advancement in business analysis techniques associated with wellbore operations, there remains a need for techniques capable of selectively considering variables throughout the oilfield operations. It is desirable that such techniques be capable of considering data or analysis performed in relation to all or desired portions of the oilfield operation. It is further desirable that such techniques be capable of one or more of the following, among others: integration of data between various portions of the oilfield operation; integration of analysis of various portions of the oilfield operation; business analysis based on multiple modules such as economics, financial analysis, reserves management, portfolio management, risk analysis, etc.; the ability to compare business analysis across fiscal regimes; integration of petrotechnical workflows, such as reservoir optimization; providing standardization of processes across the oilfield operation; provide flexibility to selectively model and adapt business planning to selected projects, business structures, workflows and/or other components of the oilfield operation; and provide features, such as audit trails, reports, alarms, security features and displays for users.

SUMMARY OF THE INVENTION

In at least one aspect, the present invention relates to a method of performing oilfield operations for an oilfield having a subterranean formation with a reservoir therein. The method involves generating a business analysis of the oilfield based on business inputs, generating an operational analysis of the oilfield based on operational inputs, and selectively integrating the business analysis with the operational analysis by using the operational outputs as at least a portion of the business inputs and by using the business outputs as at least a portion of the operational inputs to form an integrated oilfield analysis. The business analysis includes business outputs for characterizing the business impact of projects performed on the oilfield. The operational analysis includes operational outputs for characterizing the operational impact of projects performed on the oilfield. The integrated oilfield analysis includes integrated oilfield outputs for characterizing the business and operational impact of projects performed on the oilfield. The method may also involve developing an oilfield plan based on the integrated oilfield analysis and implementing the oilfield plan.

In general, in one aspect, the invention relates to a method of performing oilfield operations for an oilfield having a subterranean formation with an underground reservoir therein, the oilfield being provided with at least one wellsite with oilfield equipment for extracting fluid from the underground reservoir, comprising: performing an economic simulation of oilfield data to generate an oilfield revenue forecast having an oilfield production forecast, at least a portion of the oilfield data collected from the wellsite; determining an economic production limit based on the oilfield revenue forecast; characterizing the underground reservoir using at least one of a plurality of volume estimating techniques to generate reservoir information, the at least one of the plurality of volume estimating techniques comprising the oilfield production forecast and the economic production limit; and generating output using the reservoir information.

In general, in one aspect, the invention relates to a system for performing oilfield operations for an oilfield having a subterranean formation with an underground reservoir therein, the oilfield being provided with at least one wellsite with oilfield equipment for extracting fluid from the underground reservoir, comprising: an economic analysis tool for: performing an economic simulation of oilfield data to generate an oilfield revenue forecast having an oilfield production forecast, at least a portion of the oilfield data collected from the wellsite, and determining an economic production limit based on the oilfield revenue forecast; a reserves management tool for characterizing the underground reservoir using at least one of a plurality of volume estimating techniques to generate reservoir information, the at least one of the plurality of volume estimating techniques comprising the oilfield production forecast and the economic production limit; and a reporting tool for generating output using the reservoir information.

In general, in one aspect, the invention relates to a computer readable medium storing instructions to perform oilfield operations for an oilfield having a subterranean formation with an underground reservoir therein, the oilfield being provided with at least one wellsite with oilfield equipment for extracting fluid from the underground reservoir, the instructions comprising functionality to: perform an economic simulation of oilfield data to generate an oilfield revenue forecast having an oilfield production forecast, at least a portion of the oilfield data collected from the wellsite; determine an economic production limit based on the oilfield revenue forecast; characterize the underground reservoir using at least one of a plurality of volume estimating techniques to generate reservoir information, the at least one of the plurality of volume estimating techniques comprising the oilfield production forecast and the economic production limit; and generate output using the reservoir information.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 1A depicts a survey operation being performed by a seismic truck. FIG. 1B depicts a drilling operation being performed by a drilling tool suspended by a rig and advanced into the subterranean formation. FIG. 1C depicts a wireline operation being performed by a wireline tool suspended by the rig and into the wellbore of FIG. 1B. FIG. 1D depicts a production operation being performed by a production tool being deployed from the rig and into the completed wellbore of FIG. 1C for drawing fluid from the downhole reservoirs into surface facilities.

DETAILED DESCRIPTION OF THE INVENTION

Figure 1A:
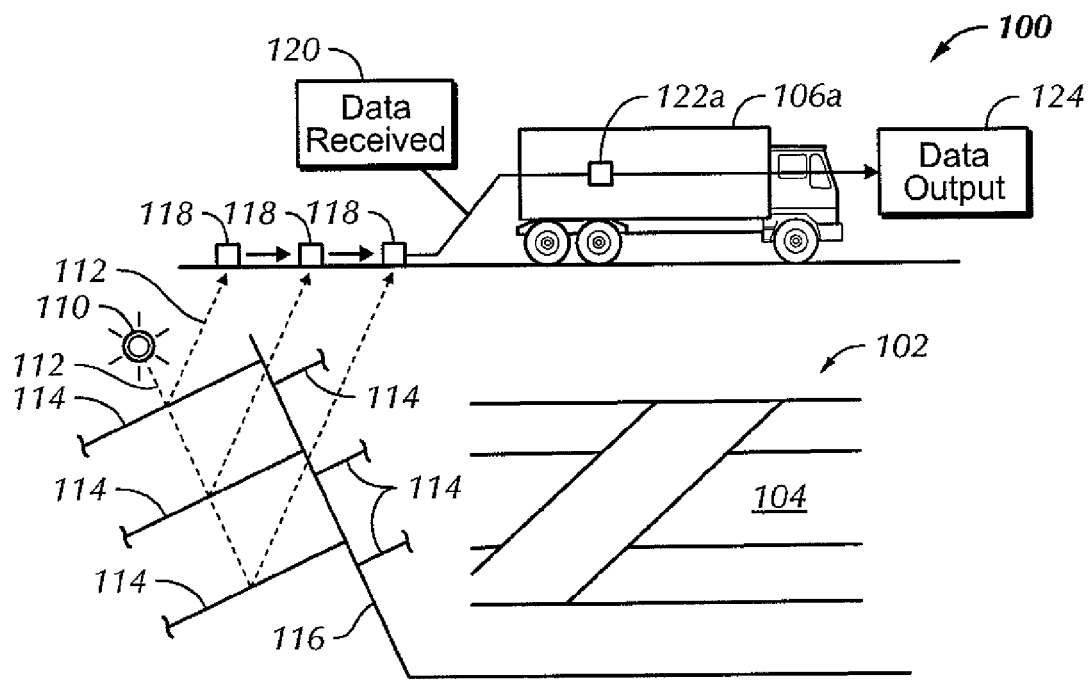
FIGS. 1A-1D depict a schematic view of an oilfield having subterranean structures containing reservoirs therein, various oilfield operations being performed on the oilfield.

Presently preferred embodiments of the invention are shown in the above-identified FIGS. and described in detail below. In describing the preferred embodiments, like or identical reference numerals are used to identify common or similar elements. The FIGS. are not necessarily to scale and certain features and certain views of the FIGS. may be shown exaggerated in scale or in schematic in the interest of clarity and conciseness.

FIGS. 1A-1D depict schematic views of an oilfield 100 having subterranean structures 102 containing reservoirs 104 therein and depicting various oilfield operations being performed on the oilfield. FIG. 1A depicts a survey operation being performed by a seismic truck 106. The survey operation is a seismic survey operation for producing sound vibrations. In FIG. 1A, one such sound vibration 112 reflects off a plurality of horizons 114 in an earth formation 116. The sound vibration(s) 112 is (are) received in by sensors, such as geophone-receivers 118, situated on the earth's surface, and the geophones 118 produce electrical output signals, referred to as data received 120 in FIG. 1.

In response to the received sound vibration(s) 112 representative of different parameters (such as amplitude and/or frequency) of the sound vibration(s) 112. The data received 120 is provided as input data to a computer 122a of the seismic recording truck 106, and responsive to the input data, the recording truck computer 122a generates a seismic data output record 124. The seismic data may be further processed as desired, for example by data reduction.

Figure 1B:
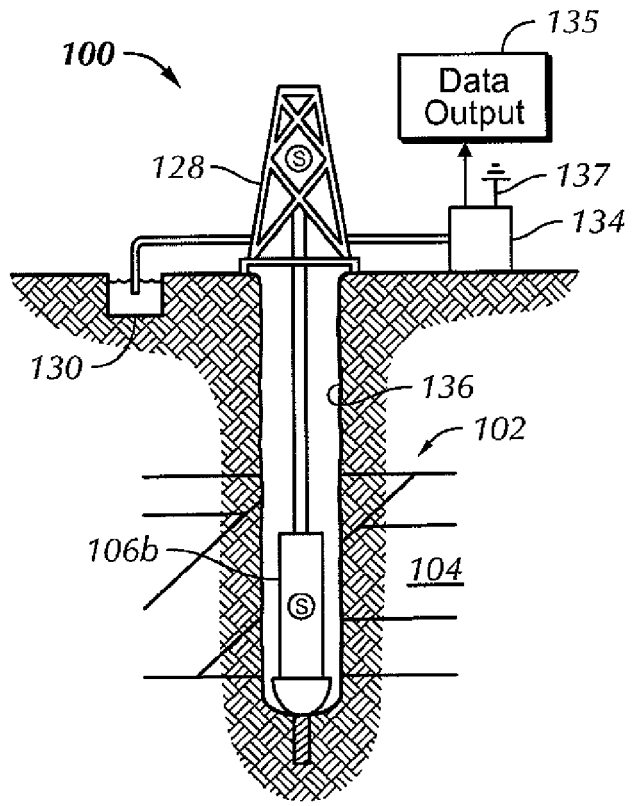

FIG. 1B depicts a drilling operation being performed by a drilling tool 126 suspended by a rig 128 and advanced into the subterranean formation 102 to form a wellbore 136. A mud pit 130 is used to draw drilling mud into the drilling tool via flow line 132 for circulating drilling mud through the drilling tool and back to the surface. The drilling tool is advanced into the formation to reach reservoir 104.

A surface unit 134 is used to communicate with the drilling tool and offsite operations. The surface unit is capable of communicating with the drilling tool to send commands to drive the drilling tool, and to receive data therefrom. The surface unit is preferably provided with computer facilities for receiving, storing, processing, and analyzing data from the oilfield. The surface unit collects Drilling Data Output 135 generated during the drilling operation. Computer facilities, such as those of the surface unit, may be positioned at various locations about the oilfield and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters and/or operating conditions. These sensors preferably measure oilfield parameters, such as weight on bit, torque on bit, pressures, temperatures, flow rates, compositions and other parameters of the oilfield operation.

The information gathered by the sensors may be collected by the surface unit and/or other data collection sources for analysis or other processing. The data collected by the sensors may be used alone or in combination with other data. The data may be collected in a database and all or select portions of the data may be selectively used for analyzing and/or predicting oilfield operations of the current and/or other wellbores.

Data outputs from the various sensors positioned about the oilfield may be processed for use. The data may be may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical and/or reservoir engineering simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

A transceiver 137 may be provided to allow communications between the surface unit and the oilfield. The controller may be used to actuate mechanisms at the oilfield via the transceiver and based on these decisions. In this manner, the oilfield may be selectively adjusted based on the data collected. These adjustments may be made automatically based on computer protocol, or manually by an operator. In some cases, well plans will be adjusted to select optimum operating conditions, or to avoid problems.

Figure 1C:
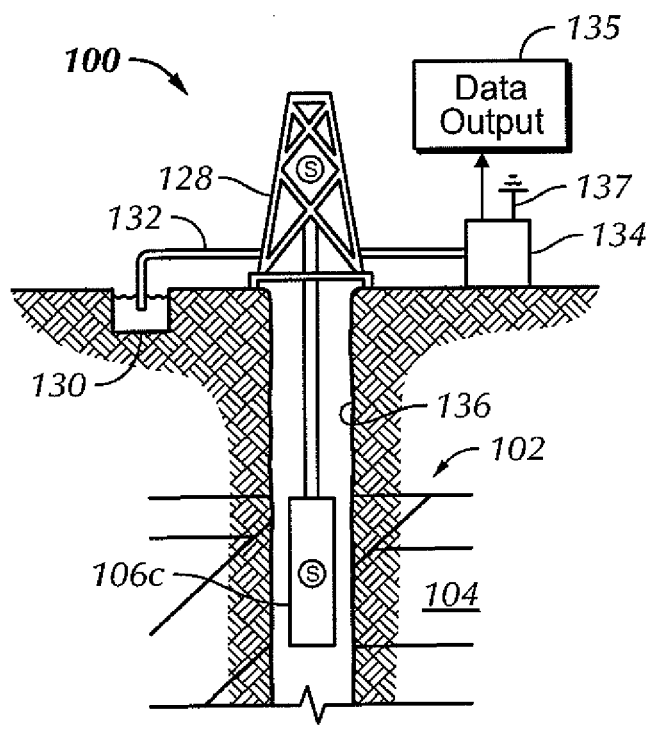

FIG. 1C depicts a wireline operation being performed by a wireline tool 138 suspended by the rig 128 and into the wellbore 136 of FIG. 1B. The wireline tool is deployed into a wellbore for performing downhole tests and/or collecting samples. The wireline tool may be used to provide another method and apparatus for performing a seismic survey operation. The wireline tool of FIG. 1C may have an explosive or acoustic energy source 144 that provides electrical signals to the surrounding subterranean formations 102.

The wireline tool may be operatively linked to, for example, the geophones 118 stored in the computer 122a of the seismic recording truck 106 of FIG. 1A. The wireline tool may also provide data to the surface unit. As shown Seismic Data Output 135 generated by the wireline tool and collected at the surface. The wireline tool may be positioned at various depths in the wellbore to provide a survey of the subterranean formation.

Figure 1D:
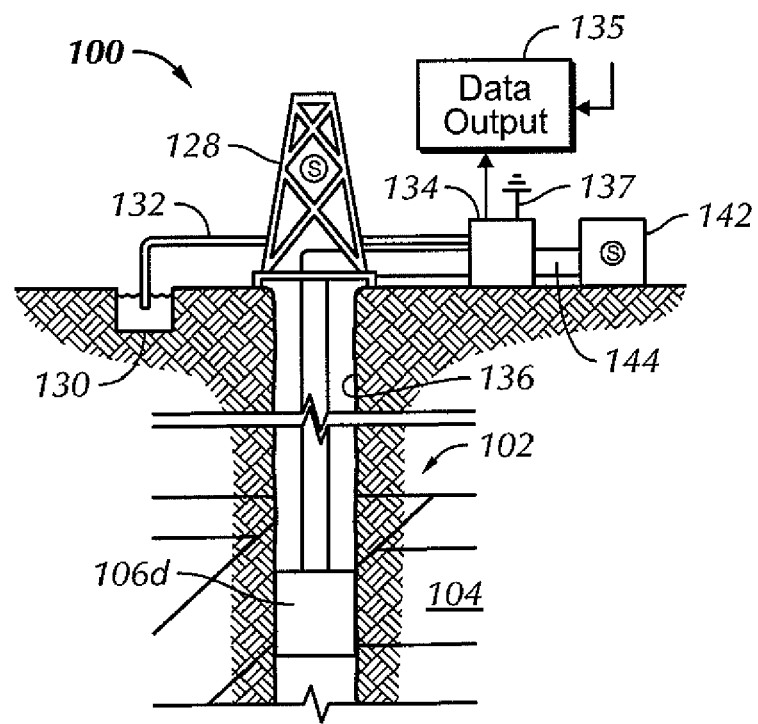

FIG. 1D depicts a production operation being performed by a production tool 140 deployed from the rig 128 and into the completed wellbore 136 of FIG. 1C for drawing fluid from the downhole reservoirs into surface facilities 142. Fluid flows from reservoir 104 through wellbore 136 and to the surface facilities 142 via a gathering network 144. Sensors (S) positioned about the oilfield are operatively connected to a surface unit 142 for collecting data therefrom. During the production process, data output 135 may be collected from various sensors and passed to the surface unit and/or processing facilities. This data may be, for example, reservoir data, wellbore data, surface data, and/or process data.

While only one wellsite is shown, it will be appreciated that the oilfield may cover a portion of land that hosts one or more wellsites. One or more gathering facilities may be operatively connected to one or more of the wellsites for selectively collecting downhole fluids from the wellsite(s).

One or more surface units may be located at the oilfield, or linked remotely thereto. The surface unit may be a single unit, or a complex network of units used to perform the necessary data management functions throughout the oilfield. The surface unit may be a manual or automatic system. The surface unit may be operated and/or adjusted by a user. The surface unit is adapted to receive and store data. The surface unit may also be equipped to communicate with various oilfield equipment. The surface unit may then send command signals to the oilfield in response to data received.

Throughout the oilfield operations depicted in FIGS. 1A-D, there are numerous business considerations. For example, the equipment used in each of these figures has various costs associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

Figure 2:
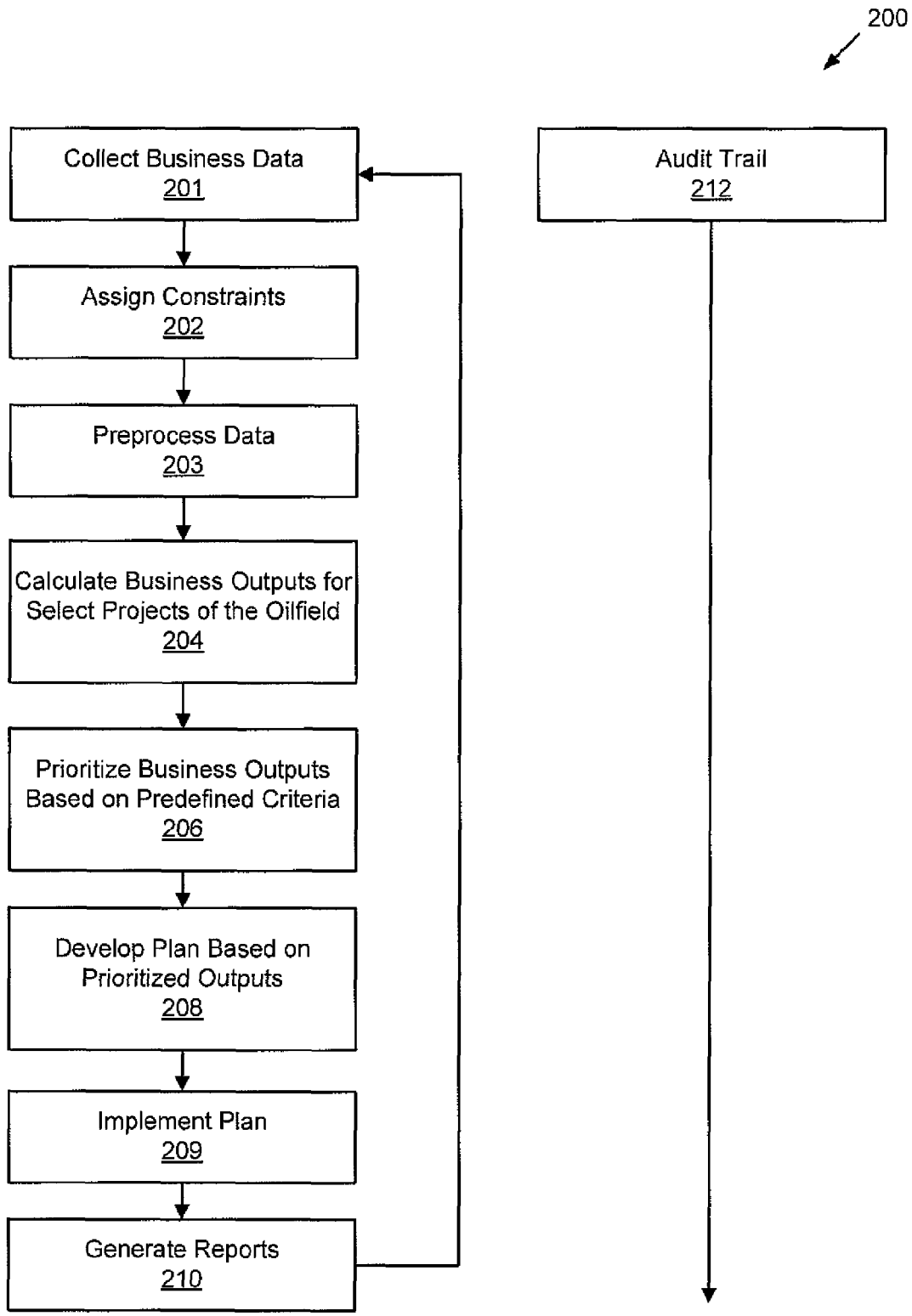
FIG. 2 is a flow chart depicting a method of performing business analysis of an oilfield operation.

FIG. 2 depicts a method 200 of performing a business analysis of an oilfield, such as the oilfield 100 of FIGS. 1A-1D. The method involves collecting business data 201. The data may be collected by the sensors S at the oilfield and/or from other data sources or inputs. The inputs may be automatically or manually applied. The inputs may be generated from other sources, and directly input for analysis.

The data may be gathered from field data capture from one or more wellsites (producing or not), reservoir parameters (factors affecting flow of fluid from earth) and may be, for example, existing production, reservoir pressure, recovery rates, etc. Data may also be gathered from oilfield simulators, reservoir, wellbore, surface or other simulators. Data may also be from actual measurements and/or from accounting systems provided by other sources.

In performing the analysis, it may be desirable to assign limits, assumptions or other constraints 202 on the analysis to restrict the viable outcomes. For example, a cap on the price of equipment may be set to exclude those options that are not within budget limitations. The data may then be preprocessed 203. Preprocessing may be done to filter, smooth, select, restrict by type, limit within time frame, or otherwise manipulate the data.

The data may then be used to perform calculations of select projects of an oilfield 204. Various projects, such as wireline sampling described with respect to FIG. 1C, drilling additional wellsites or performing additional seismic scans may be performed. These projects may be discrete or ongoing activities performed as part of the oilfield operation. The analysis may be performed based on one or more projects of the oilfield. Various options may be analyzed for each project. For example, a business analysis may be performed to generate a list of outcomes for a given project based on different inputs. Multiple projects and multiple inputs may be used to provide a list of a wide variety of options. In this manner, it is possible to consider a wide range of projects using a wide range of options. Certain options may be weighted by importance, cost, or other factors.

The business calculations performed relate to economic analysis, financial analysis, portfolio management, and/or reserves management. Economic analysis involves an analysis of economic parameters, such as operating costs, capital investment, revenue/production sharing, details of the specific contract, tax implications, price forecast, etc. Economic indicators, such as after tax cash flow (add others), are computed based on the economic parameters and the data gathered. The computed impact of economic indicators on capital allocation are analyzed to determine a value of the project from a cash flow perspective. This may require forecasting, reviewing alternatives, evaluating various factors, repeating computations based on various factors. The analysis determines whether and when to invest in and implement project(s). Projects are implemented, for example deciding which well(s) to produce and when.

Financial analysis involves an analysis of financial parameters, such as opening balances of accounts, movement of accounts, depreciation of assets, etc. Financial indicators, such as closing balances of accounts, net income, retained earnings etc., are computed based on the financial parameters and the data gathered. Standard financial statements including balance sheet, net income statement, and cash flow statement to determine financial position of the company are computed. Computed impact of financial indicators on capital allocation is analyzed to determine an incremental value of the project from a financial perspective. This may require forecasting, reviewing alternatives, evaluating various factors, repeating computations based on various factors, etc. Whether and when to invest and implement project(s) may then be determined. Projects may also be implemented, for example, to decide which well(s) to produce and when.

Portfolio management involves an analysis of portfolio goals, such as earnings per share, production, reserves additions, capital investment etc. Portfolio project dependencies and rules, such as maximum participation in a project, resource availability etc., are also defined. Portfolio economic and financial indicators, such as after tax cash flow, reserve additions, net income, based on the economic parameters and the data gathered, are computed. Impact of portfolio economic indicators on capital allocation to determine a value of the portfolio and the incremental contribution from each project are analyzed and computed. This may require forecasting, reviewing portfolio alternatives, evaluating various factors, repeating computations based on various factors, etc. Whether and when invest and implement project(s) may then be determined. Project implementation may also be determined, for example deciding which well(s) to produce and when.

Figure 4:
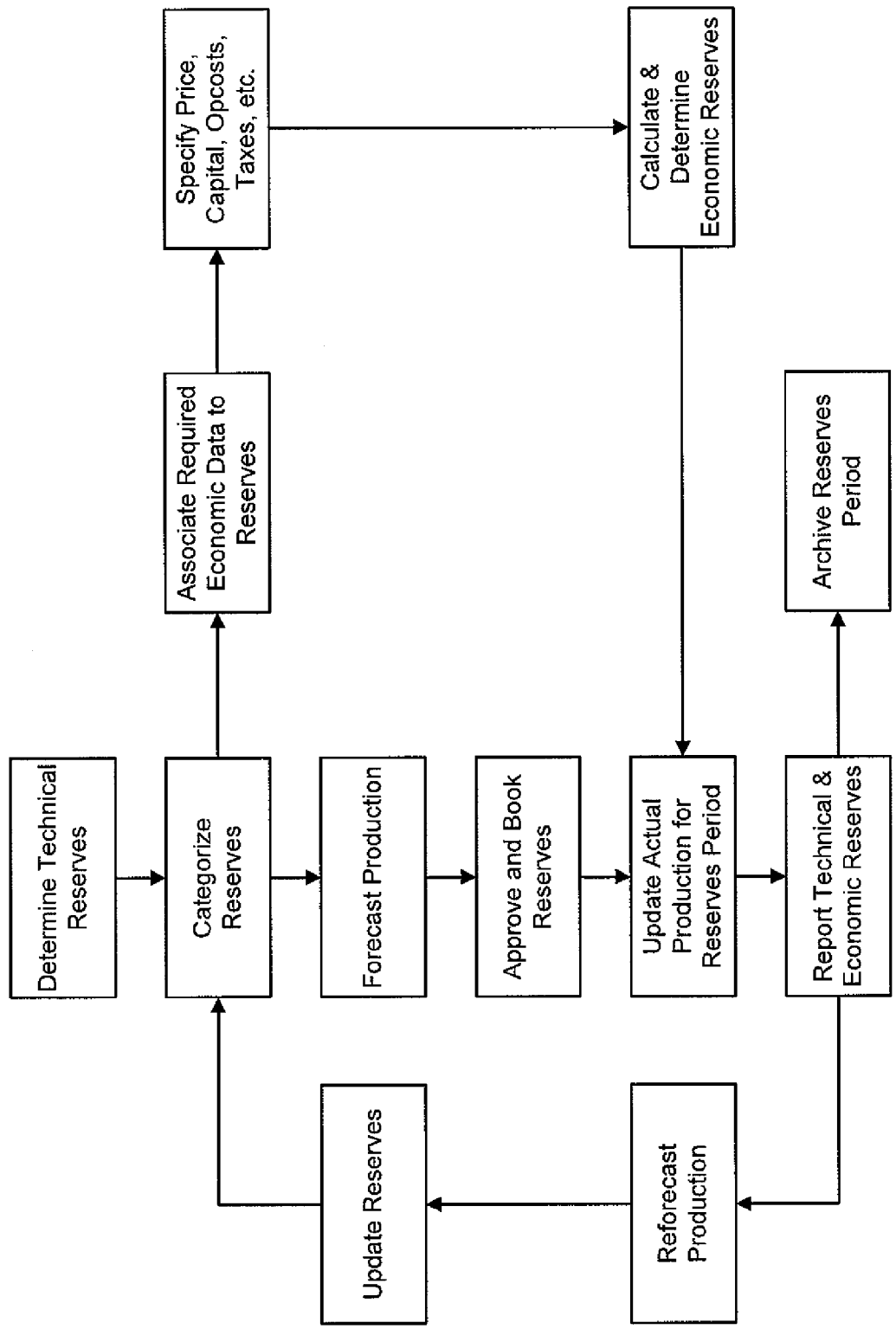
FIG. 4 flow chart depicting an economics reserves analysis.

Reserves management analysis involves an analysis of reservoir parameters, such as reserves opening balance, reserve movements, net pay, thickness, porosity, recovery factor, etc. Reservoir indicators, such as reserve closing balances, change records based on the reservoir parameters and the data gathered, are computed. Computed impact of reservoir indicators on reservoir development to determine a value of the reservoir is analyzed. More specifically, the impact of the reservoir indicators may be used to define a volume for the reservoir. This may require forecasting, reviewing alternatives, evaluating various factors, repeating computations based on various factors. Whether and when to develop reservoirs, invest and implement project(s) may also be determined. Project implementation, for example deciding which reservoir or well(s) to produce and when, may also be determined. An example of a reserves analysis, including an economics analysis, is depicted in FIG. 4.

Referring still to FIG. 2, the generated list of potential projects and the associated options may be prioritized based on predefined criteria 206. For example, the projects may be ranked by overall costs. Other criteria may be used for ranking the projects. Based on the ranking of the prioritized outputs, a plan may be developed 208. This plan may involve determining locations, number of wells, production rates, tax strategies, or other oilfield operations. The plan may then be implemented 209.

It is often desirable to generate reports or other outputs 209. The reports may include graphical, tabular or text reports of data, projects, outputs or other items. The reports may be generated on printouts or displays. Outputs generated may also be exported to other programs for use as inputs. For example, results, such as production, volume in place and tracking reserves, may be imported for analysis in other methods, such as production modeling. In some cases, select reports may provide the outputs with the biggest effect, the top five or so performers, or an overall list. Outputs may also be further analyzed to provide forecasts of future products and anticipation of results for years to come.

Such reports may be generated adjacent to other reports, such as production reports, for comparison. Comparisons may be performed manually by display, or automatically by calculation. Reports may combine outputs from multiple sources so that the overall output of the top ranked items may be considered.

In some cases, it may be desirable to provide various options to facilitate the business analysis. One such option is an audit trail 212 that provides a summary of steps taken in generating the business outputs. In one example, the audit trail is preferably adapted to provide a tax record of the selected analysis. The audit trail may also provide information about security, authorizations, charts, results, changes made, or other activities performed during the business analysis. Authorizations, for example, may impose restrictions on who can provide inputs, constraints or other adjustments to the analysis. As shown in FIG. 2, restrictions (R) are placed on the constraints to require authorization before a constraint may be assigned.

Other features, such as alarms and checks may be performed during the analysis. As shown in FIG. 2, an alarm A is performed after constraints are assigned to alert the existence of out of range data. Also shown in FIG. 2 is an error check E performed after the business calculations to confirm the accuracy of the results. Other checks, such as sense, expected value, validations, calibrations, etc., may also be performed.

Preferably, the business analysis is flexible so that it may adapt to the needs of the oilfield operation. The analysis may be customizable by providing reports, inputs or other features in the desired format. Automation and manual options may be provided to permit adjustability to the system as desired. Security may be provided so that only select adjustments and only when authorized. Other features may be provided to enhance the operability and results of the business analysis.

The process may be repeated as desired. The steps may be selectively repeated as desired. The order of the steps may be adjusted to facilitate the analysis. For example, you could preprocess data prior to assigning constraints. After performing the analysis, you may wish to repeat the preprocessing step to eliminate any out of range results. This method provides a flexible analysis which permits the method to conform to the needs of the oilfield. Once implemented, the oilfield operations may be monitored and the process repeated using new data collected over time.

Figure 3:
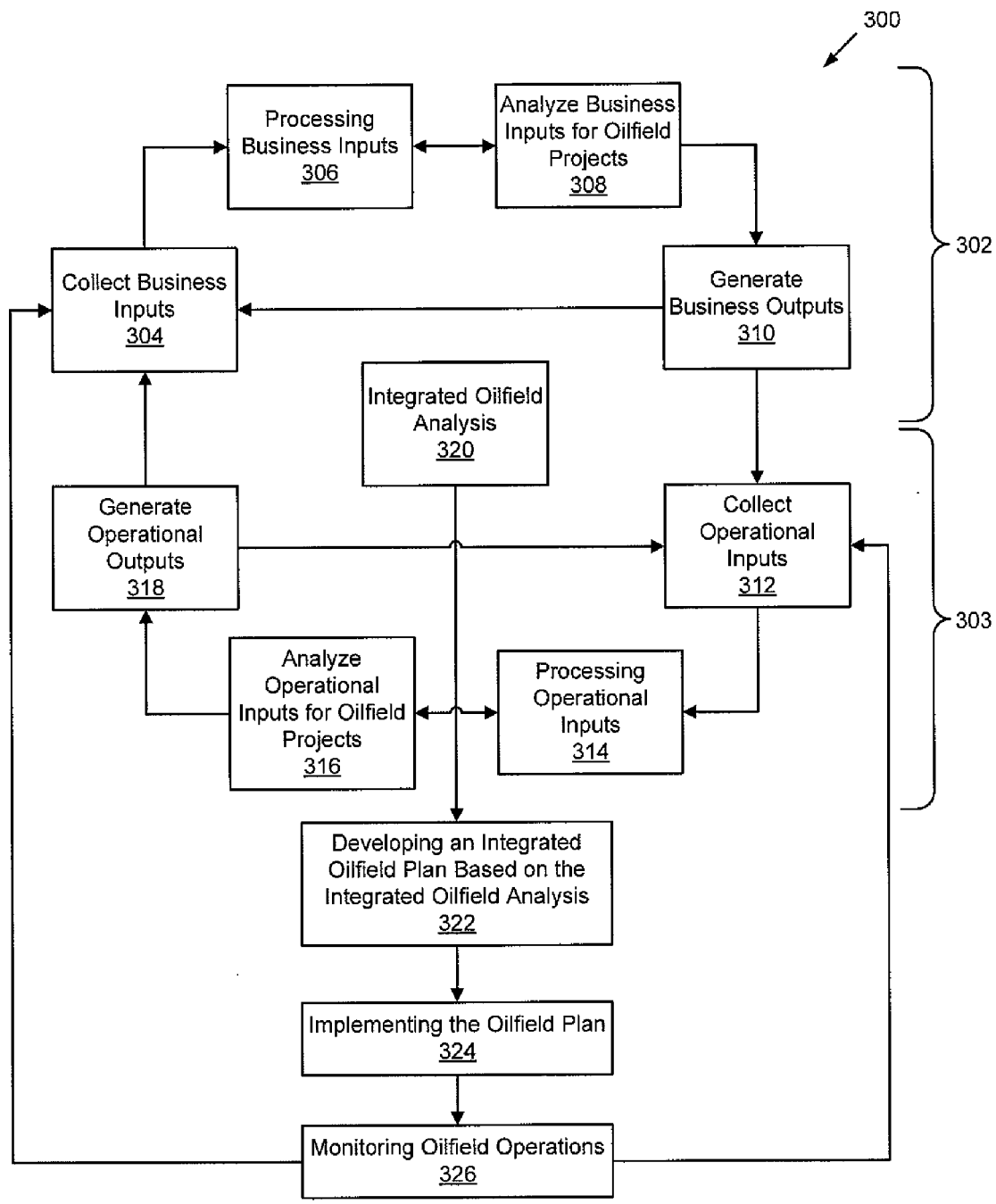
FIG. 3 is a flow chart depicting a method of performing an integrated oilfield analysis.

Referring now to FIG. 3, a method 300 for performing an integrated oilfield analysis is provided. The method involves performing a business analysis 302 and an operational analysis 303. As shown, the business analysis involves the collection of business inputs 304, the processing of business inputs 306, the analysis of business inputs for oilfield projects 308 and generating business outputs 310. These steps of business analysis 302 may be the same as the steps of the business analysis depicted in FIG. 2.

The operational analysis 303 involves collecting operational inputs 312, processing operation inputs 314, analyzing operational inputs for oilfield projects 316, and generating operational outputs 318. As with the business analysis, data is collected as described with respect to FIG. 2, as well as FIGS. 1A-D. The data may be preprocessed as described with respect to FIG. 2. The operational inputs may be analyzed using existing oilfield modeling techniques, such as those described, for example, in U.S. Pat. No. 6,980,940 and Ser. No. 10/586,283. These modeling techniques or other oilfield analysis techniques may be used to generate the operational outputs.

As shown in FIG. 3, the business outputs of the business operation may be used as inputs to the operational analysis. The operational outputs of the operational analysis may be used as inputs to the business analysis. This integrates the data exchange between the business and operational analysis to generate an integrated oilfield analysis 320. The integrated oilfield analysis may then be used to develop an integrated oilfield plan 322. The plan may then be implemented 324. The oilfield operations may be monitored 326 to provide new inputs to the operational and/or business analysis to regenerate new results. The steps may then be repeated as desired.

In performing the integrated analysis, simulations may be rerun using the new inputs as they are provided. The integrated analysis may be aligned to a specific type of business analysis, such as the economic analysis, depending on the inputs selected. For example, take a series of economic results in each fiscal regime and run simulations using each of them. In this way economic results are used together with wellbore operation (wellbore or forecast) parameters to determine optimum production plan. The optimum production plan may be generated based on an output of the integrated analysis. Other factors may also be considered. The determined plan may be implemented as designed, or adjusted as desired based on, for example, selected projects, production rate, time, etc.

Figure 5:
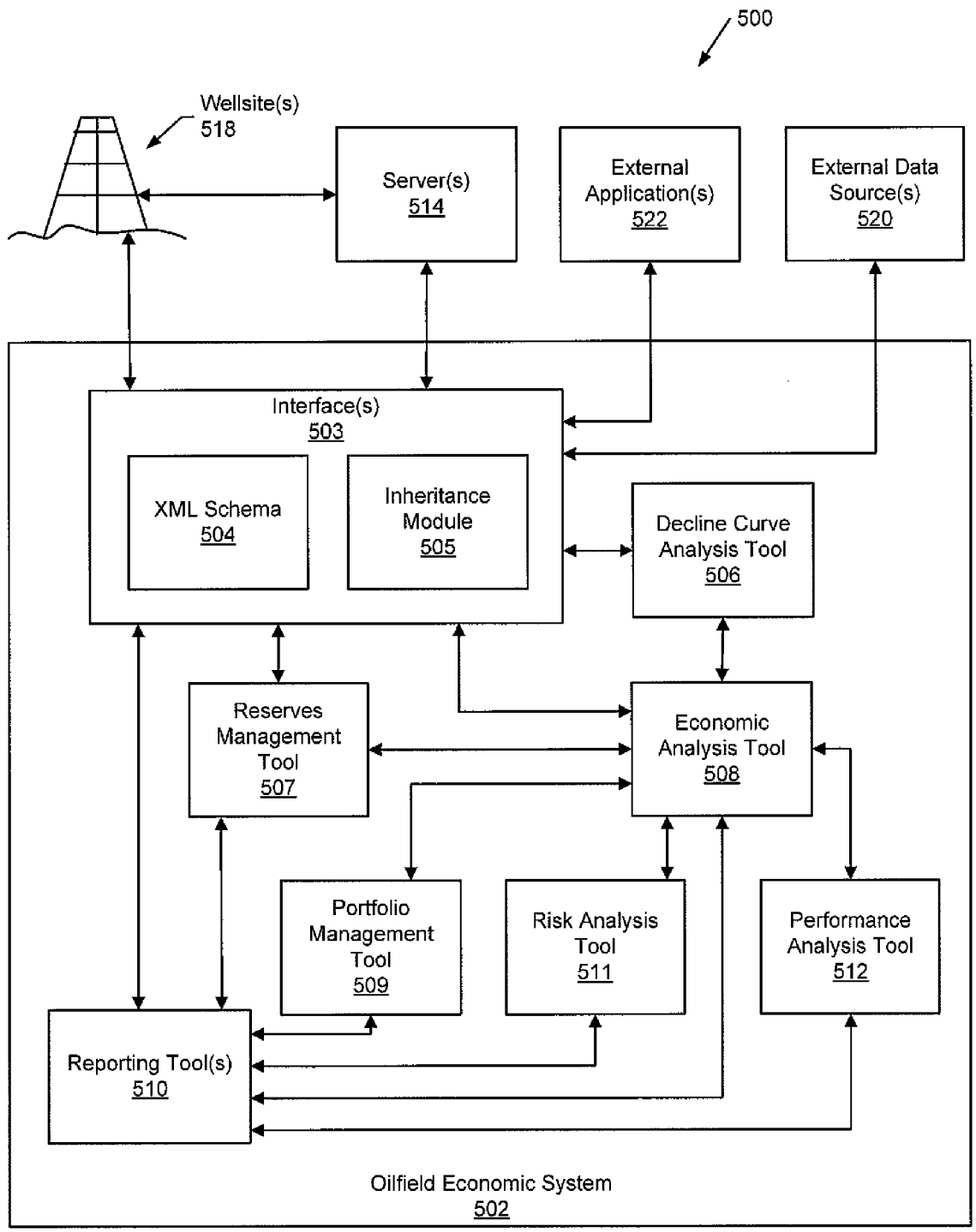
FIG. 5 shows an exemplary schematic diagram of a system for performing an oilfield operation.

FIG. 5 is a schematic view of a system 500 for performing an oilfield operation. As shown, the system 500 includes an oilfield economic system 502 operatively connected to one or more servers 512, wellsite(s) 518, external application(s) 522, and one or more external data source(s) 520.

The server(s) 512 may be used to transfer data from one or more wellsite(s) 518 to the oilfield economic system 502. The server(s) 512 may include onsite servers, a remote server, and/or a third-party server. An onsite server may be positioned at a wellsite 518 and/or other adjacent locations for distributing data from a surface unit. The surface unit may be the same surface unit as shown and described in relation to FIGS. 1B-D. The remote server is positioned at a location away from the oilfield and provides data from remote sources. The third-party server may be onsite or remote, but is operated by a third-party, such as a customer/client. In some cases, the oilfield economic system 502 may communicate data to the surface unit for adjusting an oilfield operation of the wellsite 518.

The wellsite(s) 518 may provide data measured by the sensors (S) of the wellsite as described with respect to FIGS. 1A-1D. This data may also be data received from other sources at the wellsite(s) 518. Further, the data may be stored on a computer readable medium, such as a compact disk, DVD, optical media, volatile storage, non-volatile storage, or any other medium configured to store the data.

The server(s) 512 may be capable of transferring oilfield operations data (e.g., logs), production data, measurements, and/or other oilfield data (e.g., seismic data, historical data, economics data, or other data that may be of use during analysis). The type of server used by the invention is not intended to limit the invention; the system is adapted to function with any type of server or computer system that may be employed.

The server(s) 512 collect a wide variety of data. The data may be collected from a variety of channels that provide a certain type of data, such as well logs, seismic data, etc. The data from the server(s) 512 is passed to the oilfield economic system 502 for processing. The server(s) 512 may also be used to store and/or transfer data.

In some cases, the oilfield economic system 502 and/or server(s) 512 may be positioned at the wellsite. The oilfield economic system 502 and/or server(s) 512 may also be positioned at various locations away from the wellsite. The oilfield economic system 502 may be linked to the surface unit via the server(s) 512. The oilfield economic system 502 may also be included in or located near the surface unit.

The oilfield economic system 502 includes one or more of the following modules: interface(s) 503, a decline curve analysis tool 506, a reserves management tool 507, an economic analysis tool 508, a portfolio management tool 509, a risk analysis tool 511, a performance analysis tool 512, and reporting tool(s) 510. Each of these modules is discussed below.

The oilfield economic system 502 may use the interface(s) 503 to communicate with other components, such as the server(s) 514. The interface(s) 503 receives oilfield data for processing. Data from server(s) 514 typically streams along predefined channels, which may be selected by the interface (s) 503. The interface(s) 503 may also permit communication with other oilfield or non-oilfield sources. For example, the interface(s) 503 may also receive data from field operations data sources, which may include data collected by field operators while at a site (e.g., wellsite, facility, etc.). For example, field operators may collect oilfield data using mobile devices where the data is then obtained by the oilfield economic system 502 using the interface(s) 503.

As depicted in FIG. 5, the interface(s) 503 may select a data channel of the server(s) 512 for receiving data. The interface (s) 503 may also map data channels to data from the wellsite (s) 518. The interface(s) 503 may also receive data from a data file (i.e., an extensible markup language (XML) file, a dBase file, or some other data file format).

The interface(s) 503 may also include functionality to create data requests (e.g., production, cost, ownership, surveys, logs, and risk analysis), display the user interface, and handle connection state events. The interface(s) 503 may also include functionality to instantiate the data into a data object for processing and receive a request to retrieve data from the server(s) 512, the wellsite, and/or data files. Further, the interface(s) 503 may allow a user to interact with tools in the oilfield economic system 502. For example, the interface(s) 503 may allow a user to specify inputs in the tools (e.g., decline analysis tool 506, reserves management tool 507, economic analysis tool 508, portfolio management tool 509, risk analysis tool 511, and performance analysis tool 512) of the oilfield economic system for use in analysis or management. In some cases, a number of interfaces 503 may be included in the oilfield economic system 502, where each interface is associated with at least one tool of the oilfield economic system 502.

In some cases, the interface(s) 503 may further include an XML schema 504 and an inheritance module 505. The XML schema 504 may define data attributes included in data received by the interface(s) 503. More specifically, the XML schema 504 may provide a standard data format for transmitting oilfield data to the interface(s) 503. Further, the XML schema 504 may facilitate collecting data from external application(s) 522 and external data source(s) 520. For example, the XML schema may define the data attributes required for performing an economic simulation at the economic analysis tool 508. In this example, the interface(s) 503 may receive data structured according to an XML schema 504 from an external application 522 or external data source 520, as further described below.

The inheritance module 505 may define a data hierarchy for obtaining and/or storing oilfield data. More specifically, the inheritance module 505 may define data overrides for user-specified portions of oilfield data. Further, a user may specify that data overrides be selectively associated with oilfield data at a variety of levels of granularity (e.g., geographic area, oilfield, wellsite, reservoir, etc.). For example, a user may specify economic data overrides for an oilfield. In this example, the economic data overrides would be retrieved for all wellsites in the oilfield. Further, the economic data overrides may also be applied to all the wellsites in the oilfield. Data retrieved using the inheritance module 505 may be retrieved directly from a data hierarchy rather than from a data repository (e.g., server(s) 514).

As depicted in FIG. 5, the interface(s) 503 may interact with a decline curve analysis tool 506. More specifically, the interface(s) 503 may obtain oilfield data for use by the decline curve analysis tool. Further, the interface(s) 503 may allow a user to define inputs in the decline curve analysis tool 506 to be used in a decline curve analysis. The decline curve analysis tool 506 may provide functionality for generating oilfield production forecasts. For example, the decline curve analysis tool 506 may generate a production forecast based on production history, reservoir data acquired from a wellsite or entered by a user, and/or reservoir test data using a decline curve analysis. User defined inputs for generating oilfield production forecasts may include, but are not limited to, inclusion/exclusion of oilfield data for a best-fit curve, time step, and manual adjustments to the inclusion/exclusion of oilfield data.

The oilfield production forecasts generated by the decline curve analysis tool 506 may be provided to other tools in the oilfield economic system 502. In some cases, the economic analysis tool 508 may use the decline curve analysis tool 506 to obtain an oilfield production forecast for use in an economic simulation. The economic analysis tool 508 may provide functionality for performing economic simulations. The economic simulations may be based on, but are not limited to, oilfield production forecasts, ownership data, operating costs, capital expenditures, price forecasts, and/or user-defined inputs and rules. The data for economic simulations may be obtained from interface(s) 503, as described above.

The economic simulations may result in oilfield revenue forecasts and/or economic indicators. Systems for performing such economic simulations are described, for example, in U.S. patent application Ser. No. 11/632,003 filed on Feb. 2, 2007, entitled "Method, Apparatus, and System for Visualization of Probabilistic Models", which is assigned to Schlumberger Technology Corporation, the entire contents of which is hereby incorporated by reference and in PCT Patent Application No. WO2005/027297 (PCT Patent Publication No. WO2006/017453) on Aug. 2, 2005.

The economic analysis tool 508 may also provide functionality to determine an economic production limit based on an oilfield revenue forecast. The economic production limit of an oilfield revenue forecast may define the date of maximum cumulative cash flow. In other words, the economic production limit may define the date revenue from a production operation is the same or less than the sum of operating costs, royalties, and other costs associated with the production operation.

The economic analysis tool 508 may further provide functionality for generating economic indicators. Economic indicators include, but are not limited to, net present value, internal rate of return, and profit to investment ratio. In some cases, the economic indicators may be used to evaluate the economic viability of an oilfield operation.

The oilfield revenue forecasts generated by the economic analysis tool 508 may provided to other tools in the oilfield economic system 502. In some cases, the reserves management tool 507 may interact with the economic analysis tool 508 to obtain oilfield revenue forecasts and/or oilfield production forecasts. The oilfield revenue forecasts, oilfield production forecasts, analogy forecasts, the economic production limit, and/or other types of forecasting information may be referred to as various volume estimating techniques The oilfield revenue forecasts provided to the reserves management tool 507 may include such volume estimating techniques as oilfield production forecasts and economic production limits for the oilfield operations. The reserves management tool 507 may provide functionality for managing reserves (i.e., organizing, determining, categorizing, reporting, archiving, and tracking changes to reserves and prospective resources).

In addition, the reserves management tool 507 may provide functionality for characterizing oilfield reservoirs based on oilfield revenue forecasts from the economic analysis tool 508. More specifically, the reserves management tool 507 may characterize oilfield reservoirs based on volume estimating techniques, such as reservoir information and oilfield production forecasts. For example, a reserves forecast for an oilfield reservoir may be estimated based on the current reserves as affected by the oilfield production forecast until the economic production limit is reached or the reserves forecast may be estimated based on the reserves of a neighboring wellsite or oilfield operation.

In some cases, the portfolio management tool 509 may interact with the economic analysis tool 508 to obtain oilfield revenue forecasts and/or economic indicators. The portfolio management tool 509 may provide functionality for building portfolios to be used in evaluating oilfield operations with respect to goals such as, but not limited to, earnings per share, oilfield production goals, reserves additions, and capital investments. Further, the portfolios may include oilfield operation dependencies and rules such as, but not limited to, maximum participation in an oilfield operation and resource availability. The portfolio management tool 509 may provide functionality for analyzing the impact of economic indicators from the economic analysis tool 508 on portfolios. In this case, the impact of economic indicators may be used to optimize capital planning among the portfolios of the portfolio management tool 509.

In some cases, the risk analysis tool 511 may interact with the economic analysis tool 508 to obtain oilfield revenue forecasts and/or economic indicators. The risk analysis tool 511 may provide functionality for analyzing uncertainty of oilfield operations. Typically, the uncertainty of oilfield operations is analyzed based on oilfield revenue forecasts and/or economic indicators from the economic analysis tool 508. The risk analysis tool 511 may analyze uncertainty using a variety of methods including, but not limited to, sensitivity analysis using tornado and spider diagrams, decision analysis using decision trees, and Monte Carlo simulations. Systems for performing such uncertainty analysis are described, for example, PCT Application Nos. WO2005/009033, WO2005/009032, WO2005/029872 and U.S. application Ser. Nos. 10/802,524, 10/802,622, 10/802,622, and 11/053,575. Further, systems for performing such uncertainty analysis also include U.S. patent application Ser. No. 11/432,121 filed on May 11, 2006, and PCT Patent Application No. WO2007/068794 filed on May 11, 2007, both entitled "Method, Apparatus, and System for Generating Decision Trees Integrated with Petro-technical Workflows", the entire contents of which are hereby incorporated by reference; and U.S. patent application Ser. No. 11/650,722 filed on Jan. 8, 2007, and PCT Patent Application No. WO2007/001588 filed on Jan. 19, 2007, both entitled "Method for Assessment of Uncertainty and Risk", the entire contents of which are hereby incorporated by reference.

In some cases, the performance analysis tool 512 may interact with the economic analysis tool 508 to obtain oilfield revenue forecasts and/or economic indicators. The performance analysis tool 512 may provide functionality for comparing oilfield forecasts with actual oilfield data to analyze performance of an oilfield operation. The actual oilfield data may be data obtained from wellsite(s) as described above with respect to FIGS. 1A-1D. Further, the oilfield forecasts may be oilfield revenue forecasts and/or economic indicators obtained from the economic analysis tool 508. The performance analysis tool 512 may analyze performance of an oilfield operation by incrementally comparing the differences between a current oilfield forecast and any number of archived oilfield forecasts. For example, the performance analysis tool 512 may provide functionality for isolating causes of a current oilfield forecast by allowing a user to modify an input used to generate an archived oilfield forecast and then performing an updated economic simulation including the modified input.

In addition, the performance analysis tool 512 may provide functionality for evaluation oilfield forecasts based on actual oilfield data. In this case, the consistency of the oilfield forecasts with actual oilfield data may be used to determine the accuracy of the oilfield forecasts.

One or more data repositories (not shown) may store the data for the oilfield economic system 502. For example, the interface(s) 503 may be configured to store data related to tools (e.g., decline analysis tool 506, reserves management tool 507, economic analysis tool 508, portfolio management tool 509, risk analysis tool 511, and performance analysis tool 512) of the oilfield economic system 502 in the one or more data repositories. The data may be stored in a format available for use in real-time (e.g., information is updated at approximately the same rate the information is received). The data may be persisted in the file system (e.g., as an XML file) or in a database. The oilfield economic system 502 may determine which storage is the most appropriate to use for a given piece of data and stores the data in a manner to enable automatic flow of the data through the rest of the system in a seamless and integrated fashion. The oilfield economic system 502 may also facilitate manual and automated workflows (such as modeling, geological, and geophysical workflows) based upon the persisted data.

In some cases, the oilfield economic system 502 may be configured to interact with external application(s) 522 to obtain oilfield data and/or economic data. For example, the oilfield economic system 502 may be configured to interact with a variety of external oilfield applications (e.g., Petrel software, PIPESIM module, HYSYS module, simulation modules, production modules, etc.). For example, the external oilfield may include those described in U.S. patent application Ser. No. 11/510,976 filed on Aug. 28, 2006, and PCT Patent Application No. WO2007/077315 filed on Aug. 30, 2007, both entitled "Method for Economic Valuation in Seismic to Simulation Workflows", the entire contents of which are hereby incorporated by reference.

In some cases, the oilfield economic system 502 may be configured to interact with external data source(s) 520 to obtain oilfield data and/or economic data. For example, the oilfield economic system 502 may be configured to obtain economic information (e.g., price, ownership data, operating costs, capital expenditures, etc.) from an external accounting data source.

The reporting tool(s) 510 may be configured to generate output based on oilfield data associated with a wellsite. More specifically, the reporting tool(s) 510 may be configured to present the results of analysis and/or management performed by tools (e.g., decline analysis tool 506, reserves management tool 507, economic analysis tool 508, portfolio management tool 509, risk analysis tool 511, performance analysis tool 512, etc.) of the oilfield economic system 502. The reporting tool(s) 510 may further be configured to present the output using the interface(s) 503. In this case, the output may be used to adjust an oilfield operation at the wellsite(s) 518. For example, the interface(s) 503 may be used to communicate data to the surface unit for adjusting the oilfield operation of the wellsite(s) 518. In another example, the oilfield operations may be adjusted by operators based on an evaluation of the output.

The reporting tool(s) 510 may be configured to prepare output in a variety of formats (e.g., spreadsheet (Microsoft Excel, Lotus 1-2-3), ad hoc reporting, third-party reporting format (Crystal Reports), flat-file, etc.). Further, the reporting tool(s) 510 may be configured to accept a variety of user configurations (e.g., type of report, target wellsites, date range for the report, recipients of the report, etc.) for a report.

Figure 6:
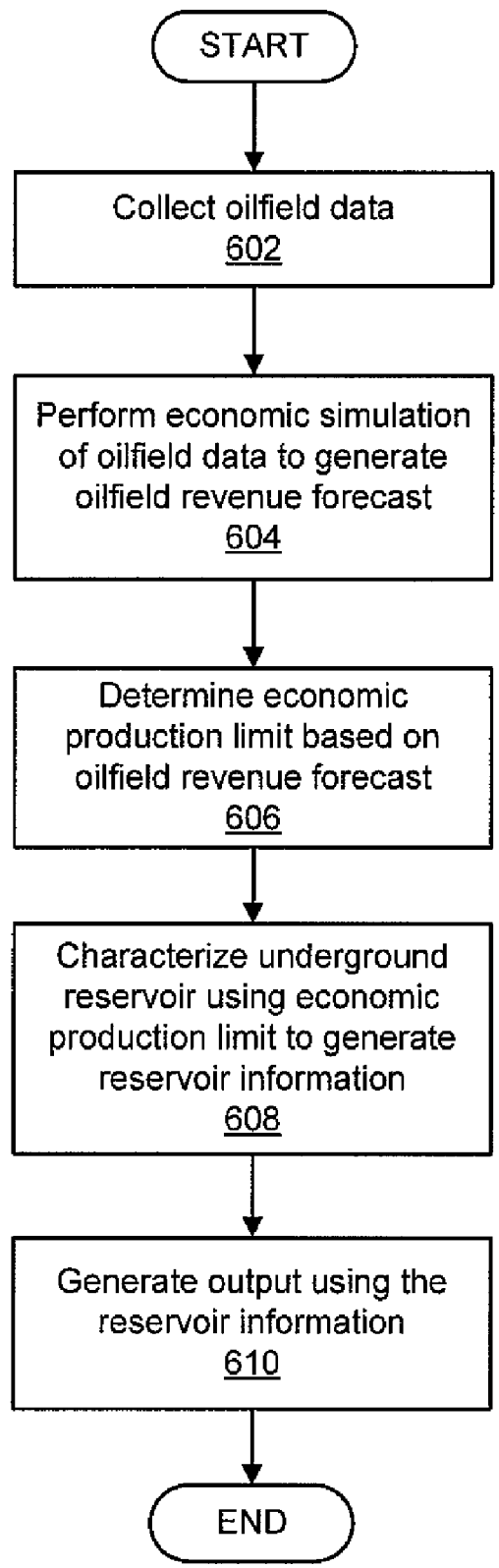
FIG. 6 shows an exemplary flow chart depicting a method for performing an oilfield operation.

FIG. 6 shows a flow chart depicting a method for performing an oilfield operation at a wellsite. The method may be performed using, for example, the system of FIG. 5. The method may involve collecting oilfield data 602, performing an economic simulation of the oilfield data to generate an oilfield revenue forecast including an oilfield production forecast 604, determining an economic production limit based on the oilfield revenue forecast 606, characterizing an underground reservoir using volume estimating techniques, such as the oilfield production forecast and the economic production limit to generate reservoir information 608, and generating output using the reservoir information 610.

Oilfield data may be collected from a variety of sources 602. As discussed with respect to FIGS. 1A-1D, oilfield data may be generated by sensors (S) at the wellsite or from other sources. The oilfield data may be transferred directly to the oilfield economic system (e.g. 502 in FIG. 5), or transferred to the modeling tool via at least one of the servers (e.g. 514 in FIG. 5). The oilfield data is then generally received by the interface of the oilfield economic system. The oilfield data may then be obtained by a decline curve analysis tool (e.g. 506 in FIG. 5). The oilfield data may include oilfield production history and reservoir data. In some cases, the oilfield data may be collected using an XML Schema (e.g. 504 in FIG. 5) and/or an inheritance module (e.g. 505 in FIG. 5) as discussed with respect to FIG. 5.

An economic simulation of the oilfield data may be performed to generate an oilfield revenue forecast including an oilfield production forecast 604. More specifically, an economic simulation as discussed with respect to the economic analysis tool (e.g. 508 in FIG. 5) may be performed on a variety of inputs (e.g., oilfield production forecast, ownership data, capital expenditures, price forecast, user-defined inputs and rules, etc.) to generate a oilfield revenue forecast. In this case, the oilfield production forecast may be generated using the decline curve analysis of the oilfield data as discussed with respect to the decline curve analysis tool (e.g. 506 in FIG. 5). The oilfield production forecast may then be obtained by the economic analysis tool (e.g. 508 in FIG. 5).

Next, an economic production limit may be determined based on the oilfield revenue forecast 606. More specifically, the economic production limit may be generated based on the oilfield revenue forecast as discussed with respect to the economic analysis tool (e.g. 508 in FIG. 5). The economic production limit of an oilfield revenue forecast may correspond to the date of maximum cumulative cash flow.

An underground reservoir may then be characterized using volume estimating techniques, such as the oilfield production forecast and the economic production limit to generate reservoir information 608. More specifically, volume estimating techniques, such as the oilfield production forecast and the economic production limit may be received at a reserves management tool (e.g. 507 in FIG. 5) and used to estimate the production of wellsite(s) associated with the underground reservoir from the current date to the economic production limit.

At this stage, in some cases, the steps of 604 to 608 may be repeated based on the reservoir information. Further, new user-defined inputs may be defined in 604 before running a new economic simulation to obtain an updated oilfield reserve forecast. For example, pricing information may be updated to run a new economic simulation for re-categorizing the underground reservoir. More specifically, the results of the new economic simulation may be compared to determine and categorize differences with the original reservoir information. In another example, when reviewing the reservoir information, a user may review and/or modify the inputs used in 604 before approving the reservoir information in the reserves management tool (e.g. 507 in FIG. 5).

Continuing with the discussion of FIG. 6, output may be generated using the reservoir information 610. For example, output showing the forecasted yearly changes in the reserves of the underground reservoir may be generated. In this example, the output may be used to adjust oilfield operations at the wellsite(s).

The steps of the method in FIG. 6 are depicted in a specific order. However, it will be appreciated that the steps may be performed simultaneously or in a different order or sequence.

Figure 7:
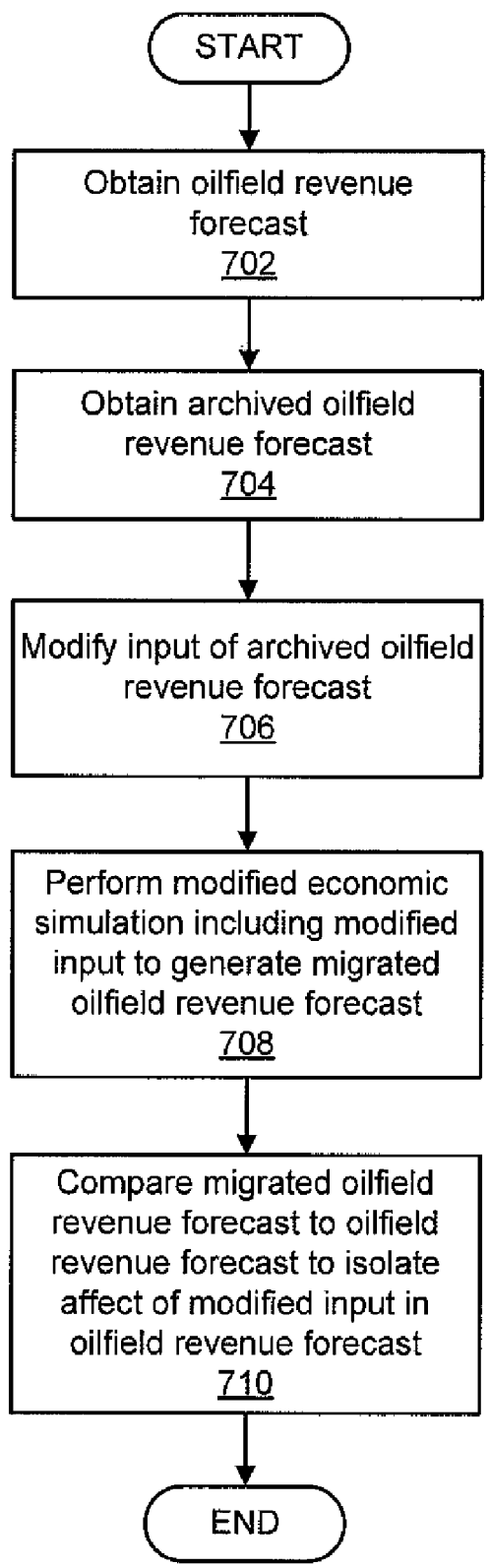
FIG. 7 shows an exemplary flow chart depicting a method for performing a performance analysis of an oilfield operation.

FIG. 7 shows a flow chart depicting a method for performing a performance analysis of an oilfield operation at a wellsite. The method may be performed using, for example, the system of FIG. 5. The method may involve obtaining an oilfield revenue forecast 702, obtaining an archived oilfield revenue forecast 704, modifying input of the archived oilfield revenue forecast 706, performing a modified economic simulation including the modified input to generate a migrated oilfield revenue forecast 708, comparing the migrated oilfield revenue forecast to the oilfield revenue forecast to isolate the affect of the modified input in the oilfield revenue forecast 710.

An oilfield revenue forecast may be obtained from a variety of sources 702. As discussed with respect to FIG. 6, an oilfield revenue forecast may be generated as described in 602-604. The oilfield revenue forecast may be obtained directly from an economic analysis tool (e.g. 508 in FIG. 5), or transferred to the performance analysis tool (e.g. 512 in FIG. 5) via at least one data repository.

An archived oilfield revenue forecast may be obtained from a variety of sources 704. The archived oilfield revenue forecast may be obtained from a data repository. In this case, the archived oilfield revenue forecast may have been originally generated as described in 602 of 604 of FIG. 6 and then archived in the data repository.

Next, an input of the archived oilfield revenue forecast may be modified 706. More specifically, an input (e.g., oilfield production forecast, ownership data, capital expenditures, price forecast, user-defined inputs and rules) of the economic simulation as discussed in 604 of FIG. 6 may be modified. For example, the modified input may be specified by a user. In another example, the input may be modified based on the differences between the inputs used for the oilfield revenue forecast and the inputs used for the archived revenue forecast.

A modified economic simulation including the modified input may be performed to generate a migrated oilfield revenue forecast 708. The modified economic simulation may be performed as discussed in 602-604 of FIG. 6.

At this stage, the migrated oilfield revenue forecast may be compared to the archived oilfield revenue forecast to isolate the affect of the modified input in the oilfield revenue forecast 710. For example, the migrated oilfield revenue forecast and the archived oilfield revenue forecast may be visualized allowing a user to identify the impact on performance of the modified input.

When a number of differences exist between the inputs used for the oilfield revenue forecast and the inputs used for the archived oilfield revenue forecast, the inputs may be modified incrementally in view of the differences. In other words, 702-710 may be repeated to modify a different input (e.g., price, production, costs, inflation, currency exchange, delays, etc.) for each of the differences. In this case, the affect of each of the differences in the performance of the oilfield revenue forecast may be isolated by incrementally migrating the archived oilfield revenue forecast until the forecast matches the oilfield revenue forecast.

The steps of the method in FIG. 7 are depicted in a specific order. However, it will be appreciated that the steps may be performed simultaneously or in a different order or sequence.

It will be understood from the foregoing description that various modifications and changes may be made in the preferred and alternative embodiments of the present invention without departing from its true spirit. For example, the order of the steps of the method may be altered, and options added, if desired.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A computer-implemented method of performing oilfield operations for an oilfield having a subterranean formation with an underground reservoir therein, the oilfield being provided with at least one wellsite with oilfield equipment for extracting fluid from the underground reservoir, comprising:

performing an economic simulation of oilfield data using one or more processors to generate an oilfield revenue forecast comprising an oilfield production forecast, wherein at least a portion of the oilfield data is collected from the at least one wellsite;

determining an economic production limit based on the oilfield revenue forecast, wherein the economic production limit comprises a projected date upon which revenue generated by the oilfield will be equal to or less than a total cost of the oilfield operations;

characterizing the underground reservoir using at least one of a plurality of volume estimating techniques to generate reservoir information, the at least one of the plurality of volume estimating techniques comprising the oilfield production forecast and the economic production limit;

generating output using the reservoir information;

obtaining an archived oilfield revenue forecast for the wellsite;

modifying input of the archived oilfield revenue forecast and performing a modified economic simulation having the modified input to generate a migrated oilfield revenue forecast; and comparing the migrated oilfield revenue forecast to the archived oilfield revenue forecast to isolate an effect of the modified input in the oilfield revenue forecast.

2. The computer-implemented method of claim 1, further comprising adjusting a first of the oilfield operations based on the output.

3. The computer-implemented method of claim 1, further comprising performing an economic simulation of the reservoir information to generate an updated oilfield revenue forecast.

4. The computer-implemented method of claim 1, wherein the oilfield data is collected from a data hierarchy specifying the wellsite, the data hierarchy selectively overriding a portion of the oilfield data of the wellsite at a higher level of granularity.

5. The computer-implemented method of claim 1, wherein the oilfield data is collected using an Extensible Markup Language (XML) schema, the XML schema defining data attributes required for performing the economic simulation.

6. The computer-implemented method of claim 1, wherein performing the economic simulation of the oilfield data comprises:

generating the production forecast based on the oilfield data and user-defined inputs; and performing an economic analysis of the production forecast to obtain the oilfield revenue forecast, the economic analysis based on operating cost, capital expenditures, ownership data, actual production, and price.

7. A computer system for performing oilfield operations for an oilfield having a subterranean formation with an underground reservoir therein, the oilfield being provided with at least one wellsite with oilfield equipment for extracting fluid from the underground reservoir, comprising:
an economic analysis tool having one or more processors configured to:
perform an economic simulation of oilfield data to generate an oilfield revenue forecast having an oilfield production forecast, at least a portion of the oilfield data collected from the at least one wellsite, and
determine an economic production limit based on the oilfield revenue forecast, wherein the economic production limit comprises a projected date upon which revenue generated by the oilfield will be equal to or less than a total cost of the oilfield operations;
wherein the system further comprises a reserves management tool having one or more processors configured to characterize the underground reservoir using at least one of a plurality of volume estimating techniques to generate reservoir information, the at least one of the plurality of volume estimating techniques comprising the oilfield production forecast and the economic production limit;
wherein the system further comprises a reporting tool having one or more processors configured to generate output using the reservoir information; and
wherein the system further comprises a performance analysis tool having one or more processors configured to:
obtain an archived oilfield revenue forecast for the wellsite;
modify input of the archived oilfield revenue forecast and obtaining a modified economic simulation for the modified input;
compare the migrated oilfield revenue forecast to the archived oilfield revenue forecast to isolate an effect of the modified input in the oilfield revenue forecast; and
perform a modified economic simulation having the modified input to generate a migrated oilfield revenue forecast.

8. The computer system of claim 7, further comprising an interface for adjusting a first of the oilfield operations based on the output.

9. The computer system of claim 7, wherein the one or more processors of the economic analysis tool is further configured to perform an economic simulation of the reservoir information to generate an updated oilfield revenue forecast.

10. The computer system of claim 7, further comprising an interface for collecting the oilfield data from a data hierarchy specifying the wellsite, the data hierarchy selectively overriding a portion of the oilfield data of the wellsite at a higher level of granularity.

11. The computer system of claim 7, further comprising an interface for collecting the oilfield data using an Extensible Markup Language (XML) schema, the XML schema defining data attributes required for performing the economic simulation.

12. The computer system of claim 7, further comprising:
a decline curve analysis tool having one or more processors configured to generate the production forecast based on the oilfield data and user-defined inputs,
wherein the economic analysis tool performs the economic simulation by performing an economic analysis of the production forecast to obtain the oilfield revenue forecast, the economic analysis based on operating cost, capital expenditures, ownership data, actual production, and price.

13. A computer readable medium for performing oilfield operations for an oilfield having a subterranean formation with an underground reservoir therein, the oilfield being provided with at least one wellsite with oilfield equipment for extracting fluid from the underground reservoir, the computer readable medium comprising instructions which, when executed, cause a computing device to:
perform an economic simulation of oilfield data to generate an oilfield revenue forecast having an oilfield production forecast, at least a portion of the oilfield data collected from the at least one wellsite;
determine an economic production limit based on the oilfield revenue forecast, wherein the economic production limit comprises a projected date upon which revenue generated by the oilfield will be equal to or less than a total cost of the oilfield operations;
characterize the underground reservoir using at least one of a plurality of volume estimating techniques to generate reservoir information, the at least one of the plurality of volume estimating techniques comprising the oilfield production forecast and the economic production limit;
generate output using the reservoir information;
obtain an archived oilfield revenue forecast for the wellsite;
modify input of the archived oilfield revenue forecast and performing a modified economic simulation having the modified input to generate a migrated oilfield revenue forecast; and
compare the migrated oilfield revenue forecast to the archived oilfield revenue forecast to isolate an effect of the modified input in the oilfield revenue forecast.

14. The computer readable medium of claim 13, wherein the instructions, when executed, cause the computing device to adjust a first of the oilfield operations based on the output.

15. The computer readable medium of claim 13, wherein the instructions, when executed, cause the computing device to perform an economic simulation of the reservoir information to generate an updated oilfield revenue forecast.

16. The computer readable medium of claim 13, wherein the oilfield data is collected from a data hierarchy specifying the wellsite, the data hierarchy selectively overriding a portion of the oilfield data of the wellsite at a higher level of granularity.

17. The computer readable medium of claim 13, wherein the oilfield data is collected using an Extensible Markup Language (XML) schema, the XML schema defining data attributes required for performing the economic simulation.

18. The computer readable medium of claim 13, wherein the instructions, when executed, cause the computing device to:
generate the production forecast based on the oilfield data and user-defined inputs; and
perform an economic analysis of the production forecast to obtain the oilfield revenue forecast, the economic analysis based on operating cost, capital expenditures, ownership data, actual production, and price.

* * * * *